United States Patent
Kesting et al.

(10) Patent No.: US 9,470,534 B2
(45) Date of Patent: Oct. 18, 2016

(54) METHOD AND SYSTEM FOR DETERMINING A DEVIATION IN THE COURSE OF A NAVIGABLE STRETCH

(71) Applicant: TomTom Development Germany GmbH, Leipzig (DE)

(72) Inventors: Arne Kesting, Berlin (DE); Stefan Lorkowski, Berlin (DE); David Schilling, Berlin (DE); Nikolaus Witte, Berlin (DE)

(73) Assignee: TomTom Development Germany GmbH, Leipzig (DE)

( * ) Notice: Subject to any disclaimer, the term of this patent is extended or adjusted under 35 U.S.C. 154(b) by 0 days.

(21) Appl. No.: 14/430,113

(22) PCT Filed: Sep. 19, 2013

(86) PCT No.: PCT/EP2013/069535
§ 371 (c)(1),
(2) Date: Mar. 20, 2015

(87) PCT Pub. No.: WO2014/044784
PCT Pub. Date: Mar. 27, 2014

(65) Prior Publication Data
US 2015/0253141 A1 Sep. 10, 2015

(30) Foreign Application Priority Data
Sep. 20, 2012 (GB) .................................. 1216788.8

(51) Int. Cl.
| | | |
|---|---|---|
| *G01C 21/12* | (2006.01) | |
| *H04W 36/00* | (2009.01) | |
| *G01C 21/30* | (2006.01) | |
| *G01C 21/32* | (2006.01) | |

(52) U.S. Cl.
CPC .............. *G01C 21/30* (2013.01); *G01C 21/32* (2013.01)

(58) Field of Classification Search
USPC .......................................... 701/409; 455/440
See application file for complete search history.

(56) References Cited

U.S. PATENT DOCUMENTS

| | | | |
|---|---|---|---|
| 6,154,152 A | 11/2000 | Ito | |
| 6,526,352 B1 * | 2/2003 | Breed ................ | G01C 21/3697 342/357.31 |

(Continued)

FOREIGN PATENT DOCUMENTS

KR 20110051468 A 5/2011

OTHER PUBLICATIONS

Search Report issued Jan. 22, 2013 for United Kingdom Patent Application No. 1216788.8.

(Continued)

*Primary Examiner* — Thomas G Black
*Assistant Examiner* — Tyler Paige

(57) ABSTRACT

A method and system for identifying a lateral deviation in the course of a road segment is described. Positional data is collected from a plurality of vehicles travelling along a road stretch. A map matching error associated with the position data is used to determine an average map matching error and average absolute map matching error for travel along the road stretch. A lateral deviation in course is identified when the average map matching error measures are both above a given threshold, and where the detected deviation is of a given minimum length. Other indicators of deviation can be considered including a direction of the possible deviation, and impact on travel in the opposite driving direction. Data relating to the determined deviation is generated, including a speed of travel through the deviated region, and used to enhance traffic information.

15 Claims, 6 Drawing Sheets

(56) References Cited

U.S. PATENT DOCUMENTS

| | | | |
|---|---|---|---|
| 8,862,384 B2 | 10/2014 | Stahlin et al. | |
| 2005/0102098 A1* | 5/2005 | Montealegre | G01C 21/3484 |
| | | | 701/533 |
| 2005/0233748 A1* | 10/2005 | Robinson | G01S 5/0289 |
| | | | 455/440 |
| 2010/0121518 A1* | 5/2010 | Tiernan | G01C 21/30 |
| | | | 701/26 |
| 2010/0312461 A1* | 12/2010 | Haynie | B61L 25/025 |
| | | | 701/117 |
| 2010/0332119 A1 | 12/2010 | Geelen et al. | |
| 2011/0047338 A1 | 2/2011 | Stahlin et al. | |
| 2011/0125401 A1* | 5/2011 | Stahlin | G01C 21/26 |
| | | | 701/532 |
| 2014/0358413 A1* | 12/2014 | Trombley | G06G 1/00 |
| | | | 701/118 |
| 2015/0253141 A1* | 9/2015 | Kesting | G01C 21/30 |
| | | | 701/409 |

OTHER PUBLICATIONS

International Search Report issued Jul. 2, 2014 for International Application No. PCT/EP2013/069535.

* cited by examiner ced in the course of a navigable stretch refers
METHOD AND SYSTEM FOR DETERMINING A DEVIATION IN THE COURSE OF A NAVIGABLE STRETCH

CROSS-REFERENCES TO RELATED APPLICATIONS

The present application is a National Stage of International Application No. PCT/EP2013/069535, filed on Sep. 19, 2013, which claims benefit to United Kingdom Patent Application No. 1216788.8 filed on Sep. 20, 2012. The entire content of these applications is incorporated herein by reference.

FIELD OF THE INVENTION

The present invention relates to methods and systems for determining a deviation in the course of at least a portion of a navigable stretch.

BACKGROUND TO THE INVENTION

There are various situations in which an actual road course may deviate, e.g. laterally, from an expected road course based upon the path of the road segment(s) of an electronic map representing the road. One common cause of a lateral road course deviation is roadworks. For example, where road works are affecting a lane or lanes of a road segment in a given direction of travel, vehicles may be forced to travel along a lane which usually forms part of the opposite carriageway, or along a hard shoulder. In either case, the actual road course followed in the given direction of travel will exhibit a lateral deviation from the expected course of travel according to the electronic map data representing the road.

Identification of the existence of a so-called (lateral) deviation or offset of a road course is useful for a number of reasons. A deviation may often have an adverse impact on traffic flow along the road. The identification of deviations of road course may therefore be useful in providing more accurate traffic information, and obtaining more accurate travel time estimates for routes. Travel along a road stretch incorporating a deviation may also necessitate greater attention by a driver, and it is useful therefore to identify affected stretches in order to provide advance warning to the driver, enhancing safety and/or to allow the driver to be guided appropriately in their navigation through the affected stretch.

It is known in current traffic information systems to consider traffic flow on different navigable stretches, and identify areas where flow is lower than might be expected. However, such methods do not consider the underlying cause of any reduction in flow, or provide a way of determining whether a deviation in road course is involved. In other arrangements, traffic messages may be received, e.g. from a third party, using a suitable distribution system, such as in the form of TMC (traffic message channel) messages. Such messages may indicate a stretch upon which traffic flow is affected by road works, but do not indicate any temporary deviation in course of the road as a result of the road works.

The Applicant has realised that there is a need for methods and systems for determining deviations in the course of navigable stretches.

SUMMARY OF THE INVENTION

In accordance with the invention there is provided a method of determining a deviation in the course of a navigable stretch represented by an electronic map, the method comprising:

obtaining positional data relating to the movement of a plurality of devices along the navigable stretch;

using data indicative of a map matching error of the positional data for a plurality of positions along the navigable stretch to determine a deviation in the course of the navigable stretch; and generating data indicative of the determined deviation.

In accordance with the invention, therefore, a map matching error associated with positional or "probe" data relating to the actual movement of devices, and hence vehicles, along the stretch provides a way to determine a deviation in the course of the navigable stretch. This provides a flexible and reliable way of determining information identifying a change in the course of the navigable stretch, which may be achieved without reliance upon, for example, third party information, and without additional infrastructure. In embodiments, as discussed below, additional details regarding an identified deviation in course may readily be determined, e.g. a start point of the deviation, an end point of the deviation, a direction of the deviation, etc. The methods of the present invention are particularly useful in determining a temporary deviation in the course of the navigable stretch, e.g. as a result of roadworks. In more complex roadwork situations, there may be several different deviations in the course of a navigable stretch over the duration of the roadworks, e.g. associated with different stages of the roadworks. The present invention provides a way of accurately obtaining information regarding the actual road course even in such situations.

The present invention may be useful in determining a deviation in the course of a navigable stretch occurring for any reason. The deviation may be a result of roadworks. The present invention is most applicable to determining a deviation in course which is temporary. The deviation is then a deviation of limited duration. However, while being temporary, typically the deviation would be of a relatively long duration, e.g. so as to have a longer lasting impact on traffic flow, rather than being a relatively transient duration, e.g. merely in terms of hours. Such deviations might include deviations occurring as a result of roadworks, lane closures, etc, which may last for at least a day or so, in contrast to more transient deviations which might be necessitated by an accident or breakdown. This is because the present invention relies upon using positional data relating to the movement of devices (associated with vehicles) along the navigable stretch in order to determine the deviation. It will be appreciated that determining the existence of a deviation will rely upon a meaningful volume of "probe" data being obtained to permit the determination to be made to a desired degree of certainty. While, in general, this means that the methods of the present invention are most applicable to deviations in course having a duration over at least a 24 hour period, depending upon traffic flow and hence levels of probe data which may be collected, shorter or longer time periods may be appropriate to different navigable stretches. For example, where a deviation affects a navigable stretch at night only, a longer duration may be required to collect a useful body of probe data. Where traffic volumes are high, useful volumes of probe data may be collected in a matter of hours. In embodiments therefore, the deviation is a temporary deviation. The deviation may have a duration of at least 24 hours.

The deviation in the course of the navigable stretch refers to the deviation in the course of the navigable stretch from an expected course based on the electronic map data. The deviation may be a deviation in the course of at least a portion of the navigable stretch. As described below, typically the deviation is a deviation in the course of only a portion of the navigable stretch, i.e. of the length thereof.

The present invention will be described by reference to particularly preferred embodiments in which the deviation in course is a lateral deviation in course. However, it will be appreciated that the present invention may be more generally applicable to the determining of a deviation in course of a navigable stretch, whether or not the deviation is, or includes a lateral deviation. Where not explicitly stated herein, and, unless the context demands otherwise, references to a "lateral deviation in course" may be replaced more generally by a reference to a "deviation in course" and vice versa. As will be understood, the term "lateral deviation" refers to an offset with respect to the width of the navigable stretch. In other words, a navigable stretch has a longitudinal direction, being a direction along the length of the stretch in a direction of travel along the stretch, and a lateral (or width-wise) direction, being a direction perpendicular to the longitudinal direction.

The present invention may be used to determine one or more deviations of a given navigable stretch and/or to determine one or more deviations of one or more navigable stretches. Where multiple navigable stretches and/or deviations are considered, the method implemented with respect to each further stretch or deviation may be in accordance with any of the embodiments described below in relation to the navigable stretch or deviation.

In accordance with the invention in any of its aspects or embodiments, the deviation is a change in the course of the navigable stretch by reference to an expected course indicated by electronic map data. The expected course may therefore be indicated by the position of the at least a portion of one or more navigable segments making up the navigable stretch as indicated by the electronic map data. The position of the navigable segment(s) may be defined by a reference line, e.g. a centreline, of the segments. The map matching error expresses the difference between a position according to the positional data and an expected position on the segment to which it is taken to correspond. A deviation would be a diverging in the course of the navigable stretch from its expected course along any part of its length.

The navigable segment(s) referred to herein are segment(s) in an area covered by an electronic map, the map comprising a plurality of segments representing navigable segments in the area covered by the map. The or each navigable stretch (and thus navigable segment(s)) is preferably a navigable road stretch (or navigable road segment(s)), although the invention extends to any form of navigable stretch or segment. The term "navigable stretch" as used herein is refers to at least a portion of one or more navigable segments. The stretch may be made up of a part of any segment or segments, and/or may include one or more entire segments. Embodiments of the present invention are described with reference to road segments and stretches. It should be realised that the invention may also be applicable to other navigable stretches made up of other types of segments. For ease of reference these are commonly referred to as a road segment or stretches.

In accordance with a further aspect of the present invention there is provided a system, optionally a server, for determining a deviation in the course of a navigable stretch represented by an electronic map, the system comprising:

means for obtaining positional data relating to the movement of a plurality of devices along the navigable stretch;

means for using data indicative of a map matching error of the positional data for a plurality of positions along the navigable stretch to determine a deviation in the course of the navigable stretch; and means for generating data indicative of the determined deviation.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

It will be appreciated that the steps of the method of the present invention may be performed exclusively on a server, or some on a server and the others on a navigation device in any combination, or exclusively on a navigation device. Performance of one or more of the steps on a server may be efficient and may reduce computational burden placed on a navigation device. Alternatively if one or more steps are performed on a navigation device, this may reduce any bandwidth required for network communication.

In embodiments in which the method is performed at least in part on a server, the server may be a "traffic server". The server may be arranged to receive traffic messages from one or more sources, and/or to generate traffic messages. In preferred embodiments, the system comprises or is a server, arranged to carry out the steps of determining the deviation in course of the navigable stretch.

In accordance with the invention, the method involves obtaining and using positional data relating to the movement of a plurality of devices along the navigable stretch in determining the deviation in course. The positional data is indicative of the position of the devices with respect to time. The positional data is therefore preferably associated with time data. The positional data relates to the movement of a plurality of devices along the navigable stretch, and thus is in respect of a plurality of positions along the stretch. The data may be in respect of positions at given intervals along the stretch.

The positional data may be positional data that is not necessarily received specifically for the purposes of the present invention. For example, the data may be data obtained from an existing database of such "probe" data, from which the relevant data may be filtered out. In some arrangements the step of obtaining the data may comprise accessing the data, i.e. the data being previously received and stored. In other embodiments, the step of obtaining the positional data comprises receiving the data from the devices, e.g. at a server. This enables the use of "live" data rather than historic data, as discussed below. Preferably the received data is positional data and associated time data. In arrangements in which the method involves obtaining or receiving the data from the devices, it is envisaged that the method may further comprise storing the received positional data before proceeding to carry out the other steps of the present invention.

As discussed above, the positional data relates to the movement of the devices with respect to time, and may be used to provide a positional "trace" of the path taken by the device. The devices may be any mobile devices that are capable of providing the positional data and sufficient associated timing data for the purposes of the present invention. The device may be any device having position determining capability. Typically the device may comprise a GPS or GSM device. Such devices may include navigation devices, mobile telecommunications devices with positioning capability, position sensors, etc. The device is preferably associated with a vehicle. In these embodiments the position of the device will correspond to the position of the vehicle. The device may be integrated with the vehicle, e.g. in-built sensor or navigation apparatus, or may be a separate device associated with the vehicle such as a (removably mountable) portable navigation apparatus. Of course, the positional data may be obtained from a combination of different devices, or a single type of device, e.g. devices associated with vehicles.

It will be appreciated that the positional data obtained from the plurality of devices, may be referred to as "probe data". The data obtained from devices associated with e.g. vehicles may be referred to as vehicle probe data. References to probe data herein should therefore be understood as being interchangeable with the term "positional data", and the positional data may be referred to as probe data for brevity herein.

In preferred embodiments the method comprises obtaining, preferably receiving, positional data relating to the movement of a plurality of devices in an area of an electronic map, the map comprising a plurality of segments representing navigable segments in the area covered by the map, and, for the selected navigable stretch (which is defined by at least a portion of one or more navigable segments), filtering the positional data to obtain positional data relating to the movement of devices along the navigable stretch. The data may be further filtered to obtain positional data relating to the movement of devices along the navigable stretch in one or both directions of travel along the stretch.

The navigable stretch may or may not be a stretch which has been selected as potentially including a deviation. Thus, the invention may be used to verify or identify the presence of a deviation. The method may comprise selecting the navigable stretch and obtaining the positional data and map matching error data relating to the selected stretch.

In some arrangements, the navigable stretch may be a stretch which has been selected based on traffic flow information. For example, the stretch may be a stretch known to be associated with a lower than expected traffic flow or which is associated with an event such as roadworks which may cause a deviation in course. The present invention may then provide a way of investigating whether a deviation in road course is responsible for a reduced traffic flow, or otherwise is present.

In some embodiments the navigable stretch is a stretch comprising at least a portion of one or more navigable segments identified in a (traffic) message, the message being indicative of an event affecting traffic flow on the at least a portion of one or more navigable segments. The present invention may further comprise receiving such a message, or a plurality of such messages, e.g. from one or more sources, and preferably from a plurality of sources. The message(s) may be a Traffic Message Channel (TMC) message, or another such message in an alternate format, such as a TPEG message, received from a third party provider. The third party might be a road authority or a provider of traffic messages based on data obtained from different sources, e.g. including road authorities. Typically information regarding an event that may affect traffic flow, e.g. roadworks, will be sent by a road authority to a third party responsible for the dissemination of the message.

In such embodiments, the present invention may provide a method of verifying and/or improving such a message by determining a deviation in the course of the navigable stretch comprising the at least a portion of one or more navigable segments on which traffic flow is affected by the event. However, the present invention may advantageously be used to determine the presence of a deviation in course of a navigable stretch even where such a deviation is not already suspected. It will be appreciated that the navigable stretch may therefore not necessarily be selected based upon traffic flow information or information indicative of an event which may necessitate a deviation in course. The method may then comprise systematically assessing different navigable stretches in a region to determine whether any deviations exist.

The navigable stretch considered may be of any suitable length. In embodiments the navigable stretch in relation to which positional data is obtained is selected to have a length greater than the likely length of any deviation. In this way, the length of a deviation may be more accurately determined, and the presence of a deviation can be established with greater certainty. Thus, preferably the determined deviation is present over only a portion of the length of the navigable stretch. In embodiments the navigable stretch comprises a plurality of consecutive navigable segments. The determined deviation preferably has a length of less than one navigable segment.

Preferably the positional data obtained and used in determining the deviation is "live" positional data. Live data may be thought of as data which is relatively current and provides an indication of what is occurring on the navigable stretch. Thus, the data may be "pseudo-live", in that it may not relate to exactly current conditions, but is "live" by contrast to "historical" data. The live data may typically relate to the movement of devices on the selected navigable stretch within the last 30 minutes. In some embodiments the live data may relate to the movement of vehicles on the selected navigable stretch within the last 15 minutes, 10 minutes or 5 minutes.

The method comprises obtaining positional data relating to the movement of a plurality of devices along the navigable stretch in one, and most preferably both directions of travel along the navigable stretch, and determining the deviation in course using a map matching error associated with the data for the or each direction of travel. Using data relating to both directions of travel may enable a determination as to the presence of a deviation to be established with greater certainty, as described below.

The positional data and the map matching error data thereof is obtained for each of a plurality of positions along the navigable stretch. Thus the step of determining the deviation in course uses data indicative of a map matching error of positional data in respect of a plurality of different positions of each device along the navigable stretch.

When positional data is received from a device in a navigation system, the positional data is matched to a position on a segment of the network of navigable segments represented by an electronic map. This process is typically referred to as "map matching", and may involve the use of various algorithms as known in the art. Such algorithms may take into account the path of travel of the given device, e.g. considering the path of the device as indicated by the trace defined by the positional data at different times for the device in order to identify a navigable segment to which the device should be mapped. The method of the present invention may extend to the step of map matching the positional data. Typically, the positional data, such as longitude and latitude coordinates obtained from a global navigation satellite systems (GNSS) receiver, is associated with timing data, e.g. a timestamp. Each item of positional data is then matched to a position along one of the navigable segments of the electronic map. In carrying out this map matching process, a map matching error indicative of a difference between a position indicated by the positional data, and the position on the navigable segment to which it is matched, may be derived in respect of each item of positional data. In embodiments, for each of the plurality of devices, a map matching error may be derived for each positional data point in respect of the device. Such a map matching error may arise for various reasons, such as, for example, general noise in the positional data signals and/or mapping errors, e.g. where a reference line of a navigable segment in the electronic map data is not correctly geo-referenced such that the position of the navigable segment represented by the electronic map does not precisely correspond to the actual position of the segment in reality. In some situations, the map matching error may occur because of a change in course of the navigable stretch, such that the actual course followed by the devices does not correspond to the expected course indicated by the position of the navigable segment or segments defining the navigable stretch.

The present invention uses data indicative of the map matching error of the positional data relating to the movement of a plurality of devices along the navigable stretch to determine a deviation in the course of at least a portion of the navigable stretch. In embodiments the method involves using positional data for the plurality of devices and corresponding map matching error data for the positional data for each of a plurality of positions along the navigable stretch.

The method may or may not extend to the step of deriving the map matching error data, or associating the map matching error data with the positional data.

As described above, the positional data may be accessed from already obtained positional data, rather than being collected specifically for the purposes of the present invention. In such cases, the positional data may already be associated with map matching error data. Thus, a step of obtaining the map matching error data may comprise accessing the data.

In accordance with some embodiments of the invention, the method may extend to the step of deriving the map matching error data. The method may therefore comprise the step of matching the positional data from the plurality of devices to positions along the navigable stretch represented by the electronic map. In some embodiments the method may comprise matching the positional data relating to the movement of the plurality of devices along the navigable stretch to a position on the navigable segment or segments of the navigable stretch as represented by the electronic map, and detecting a map matching error indicative of a difference in the position of the devices according to the positional data and the position of the navigable segment or segments to which the data is mapped.

In embodiments the data indicative of a map matching error for the positional data is indicative of a map matching error with respect to an expected course of the navigable stretch represented by the electronic map. The expected course may be defined in relation to a reference line along the segment or segments defining the navigable stretch. The reference line may be a map centerline of the or each segment. In other words, and as known in the art, a navigable segment as represented by an electronic map may be described by a line, and attributes of the segment may be assigned with respect to the line. The line will typically be representative of the centre of a single directional road or, for a bi-directional road, the middle between the lanes having a first direction of travel and the lanes having the opposite direction of travel.

In accordance with the invention in any of its embodiments, the map matching error is preferably indicative of a lateral offset of the determined position according to the positional data and a position along the navigable stretch as represented by the electronic map (along the or a navigable segment thereof) to which the determined position is matched. Thus the error is indicative of an error in the lateral direction relative to the navigable stretch, and should be understood in this manner where referred to herein.

In embodiments, the step of determining a deviation in course comprises using data indicative of the map matching error of positional data relating to the travel of a plurality of devices along a navigable stretch that comprises two or more consecutive navigable segments, preferably for each of a plurality of positions along the navigable stretch. Determining the deviation in course will take into account map matching error data with respect to position along the stretch. Considering a relatively extended navigable stretch may result in greater precision in identifying a deviation in course. The steps below, which are described as being performed using the positional data and its map matching error, are preferably carried out using positional data and its map matching error for each of a plurality of positions along the navigable stretch.

It will be appreciated that the map matching error associated with the positional data may allow a deviation in course of a navigable stretch to be detected. In general terms, a map matching error of a given level may be indicative of a deviation in course, rather than the usual errors due to inaccuracy in the positional data obtained, or the position of navigable segments as represented by the electronic map. As the positional data is obtained from a plurality of devices travelling along the navigable stretch, by taking a suitable amount of data, e.g. probe traces, to be statistically significant, reliable conclusions may be drawn as to when a deviation in course exists. References herein to a map matching error may be understood to refer to map matching error data or data indicative of a map matching error, and may be replaced by such terms.

In some embodiments the step of determining the deviation may comprise detecting a potential deviation in course of the navigable stretch using the data indicative of a map matching error of the positional data. The detected potential deviation may then be taken as being a deviation, and the method may then comprise making a determination of the presence of a deviation corresponding to the detected potential deviation. In preferred embodiments, however, certain steps are taken to enable greater accuracy in determining the existence of a deviation in course, and, where desired, additional information regarding the deviation, allowing the deviation to be more reliably and confidently distinguished from, for example, background noise in the positional data. In preferred embodiments the method comprises detecting a potential deviation in course of the navigable stretch using the data indicative of a map matching error of the positional data, and making a determination of the presence of a deviation in course (only) when one or more, and preferably a plurality of, deviation in course indicators are additionally found to be present using the map matching error data.

The method may involve taking any or all of the steps described below, and in any order, to detect potential deviations and optionally one or more deviation indicators. Where multiple steps are used, the method may involve using a suitable algorithm or algorithms to implement the multiple steps in any suitable order, and/or simultaneously to provide a test for deviation.

The method may comprise using one or more measures indicative of the average map matching error of the positional data to detect a potential deviation in course of the navigable stretch. The method may comprise determining the one or more measures using the data indicative of the map matching error. The one or more measures used or determined are in respect of a plurality of positions along the navigable stretch. Preferably the measures comprise an average map matching error and/or an average absolute map matching error based on the positional data from the plurality of devices. References herein to an "average" map matching error refer to an average map matching error in respect of the plurality of devices, i.e. an average based on the errors determined for each device for a given position along the stretch. The average or average absolute map matching error or errors are preferably determined with respect to distance along the navigable stretch. Thus a plurality of average or average absolute map matching error values may be obtained in respect of different positions along the stretch. In preferred embodiments, the method thus comprises using one or both of an average map matching error and an average absolute map matching error for the positional data from different devices, and preferably in respect of each of a plurality of positions along the stretch, to detect a potential deviation in course of the navigable stretch (and thus in the step of determining a deviation in course). The method may further comprise the step of deriving the average map matching error and/or average absolute map matching error. This may be carried out using other map matching error data for the positional data e.g. individual map matching error data in respect of items of position data. In other arrangements, the method may involve accessing such data where already derived.

The average map matching error is representative of the average map matching error of the positional data obtained from the different devices, reflecting the direction of the error, e.g. whether it is indicative of a lateral offset to the left or the right. The average absolute map matching error, meanwhile, is representative of the average magnitude of the data, and is indifferent of the direction of the error, e.g. whether a left or right lateral offset. Unless the context demands otherwise, any of the steps described herein as being performed using map matching error data to determine a potential deviation, may be implemented using one or both of an average map matching error and an average absolute map matching error.

Map matching errors due to inherent fluctuations in the accuracy of the positioning data, e.g. due to "noise" in the positioning, e.g. GPS, signals, will typically give rise to errors in both directions, which may cancel out such that the average map matching error may be relatively low. However, where a deviation is due to a change in course, map matching errors may be expected to occur in the same direction, such that the average map matching error will be significant. It has been found that consideration of both the average map matching error and an average absolute map matching error for different positions along the stretch may enable deviations to be determined more reliably. In the region of a deviation in course, both types of map matching error would be expected to be significant in magnitude. In regions where no deviation is present, it would be expected that the average absolute map matching error would be greater than or equal to the average map matching error, due to the cancelling out of errors arising in different directions attributable to positioning signal noise or fluctuations. As the average absolute map matching error considers only the magnitude, and not the direction of such errors, it would typically be relatively higher than the average map matching error. In contrast, where a deviation was present, both the average and average absolute map matching error would be expected to be relatively high. In embodiments the method may comprise comparing a magnitude of an average absolute map matching error to a magnitude of an average map matching error to determine the presence of a potential deviation in course. The detection of a potential deviation may be based upon the relative magnitudes of the average and average absolute map matching errors and/or the absolute magnitudes of one or both of the average and average absolute map matching errors.

As discussed above, the method may comprise detecting the presence of a potential deviation in course of the navigable stretch by reference to a magnitude of at least one, and preferably both, of an average map matching error and an average absolute map matching error of the positional data for the plurality of devices. In some embodiments the method may comprise detecting the presence of a potential deviation in course when the magnitude of the average map matching error is greater than or equal to the magnitude of the average absolute map matching error and/or when a magnitude of both the average map matching error and the average absolute map matching error exceed a given threshold or thresholds.

The method may comprise determining one or more of a spatial extent, start point, end point, magnitude and direction of a detected potential deviation. This may be carried out be consideration of the map matching error data with respect to distance along the navigable stretch.

As described above, preferably one or more deviation in course indicators are derived which may provide additional confirmation that a potential deviation identified should indeed be taken as the determined deviation in course in respect of which data is generated. Any or all of the deviation indicators described below may be determined, and in any order. The indicators may be determined using the map matching error data, and preferably the one or more measures indicative thereof, e.g. an average map matching error and/or absolute map matching error.

The method may comprise determining the presence of a deviation in course indicator when a detected potential deviation includes a deviation in a first direction away from an expected course followed by a deviation in an opposite second direction back toward the expected course along the navigable stretch. The first and second directions may be lateral directions, e.g. to the left and right relative to a centerline of the or each navigable segment of the navigable stretch or vice versa. The method may comprise determining the presence of the deviation in course indicator only when the deviation in the second direction occurs within a given distance along the navigable segment of the deviation in the first direction.

Alternatively or additionally, the method may comprise determining the presence of a deviation in course indicator when a detected potential deviation in course has a spatial extent exceeding a given threshold. It has been found that deviations in course are typically associated with relatively longer spatial extents than apparent deviations which are in fact attributable to inaccuracies in the positional data or map data.

Alternatively or additionally the method may comprise determining the presence of a deviation in course indicator when a detected potential deviation in course has a magnitude exceeding a given threshold. The magnitude of the deviation may be determined by reference to the map matching error data, e.g. a magnitude of an average map matching error or average absolute map matching error of the positional data. In embodiments the magnitude is a lateral offset, preferably of greater than 10 m. This helps to distinguish a deviation in course from inherent errors in positioning data as a result of the finite accuracy of GPS signals.

Alternatively or additionally the method may comprise determining the presence of a deviation in course indicator based on a direction of the detected potential deviation. The direction is a lateral direction e.g. relative to a centerline of the segment(s) forming the navigable segment. In embodiments a deviation indicator is determined to be present when a detected potential deviation in course is in a direction toward the path of travel along the navigable stretch in an opposite direction. This may indicate a deviation in which vehicles are forced to drive along the opposite carriageway.

A further step of verifying a detected potential deviation in course may comprise correlating the position of the deviation along the stretch with map data representing the region. A potential deviation obtained on the basis of map matching data may be discounted, for example, where it is in the region of a complex intersection or other part of a map where relatively higher map matching errors might be expected due to the structure of the road network.

Accordingly, in embodiments, the method comprises determining the presence of a deviation in the course of a navigable stretch when one or more deviation indicators are found to be present, the deviation indicator or indicators being based on one or more of a spatial extent, direction or magnitude of a detected potential deviation indicated by the map matching error data associated with the positional data.

In accordance with preferred embodiments any of the steps described in relation to determining the presence of a deviation using the map matching error data are carried out by reference to positional data for a given direction of travel.

Alternatively or additionally, the method may comprise determining a potential deviation in course in respect of a first direction of travel, and determining the presence of a deviation in course indicator when a potential deviation in course is additionally detected for the opposite driving direction using the data indicative of a map matching error of the positional data. The determination of the deviation in course indicator may occur when the positions of the potential deviations in course in each driving direction are located at least partially at corresponding positions along the segment. In these embodiments the deviation in course for the opposite driving direction may be determined in a similar manner to that described above, but using positional data and associated map matching error data relating to devices travelling in that direction of travel. It will be appreciated that a deviation in course in one driving direction may often necessitate a deviation in course in the opposite driving direction to accommodate it, such that the presence of deviations in both driving directions at corresponding positions along the navigable stretch may provide a further indication that a deviation in course is indeed present.

Once a deviation has been determined, whether this is a detected potential deviation with or without verification by reference to one or more additional deviation indicators, data indicative of the deviation is generated. The data indicative of the determined deviation in the navigable stretch that is (determined and) generated may be electronic map data. The data is at least indicative of the presence of a determined deviation. The method may extend to determining additional data relating to a determined deviation. Thus the data indicative of the determined deviation may include any or all of a location of the deviation, which may be in absolute terms or relative to the navigable stretch, or a segment or segments forming the navigable stretch, a spatial extent of the deviation, a start point and/or end point of the deviation, a direction of the deviation, and an expected speed of travel along the deviated portion of the stretch. The expected speed of travel may be based upon an average speed of travel determined using the positional data. The direction of the deviation is a lateral direction of the deviation relative to a reference line e.g. centerline of the navigable stretch. For example, the direction of deviation may be expressed as a left or right direction deviation. Any additional data is obtained using the positional data and/or the map matching error associated therewith.

In preferred embodiments, the method further comprises storing the generated data. The data may be stored in any manner, and it will be appreciated that this step may involve storing a pointer to the data etc. Preferably such a step is carried out by a server. The data indicative of the deviation may be stored in a database of deviation information. The present invention extends to a database containing data obtained in accordance with any of the embodiments of the method described herein. Such a database could provide a body of information which could then be provided to third parties. The messages may then be disseminated via usual channels as higher quality data. The stored data may or may not then immediately be transmitted or otherwise used.

Once the data indicative of the determined deviation has been determined, the data may be used in various manners. The data may be provided to one or more vehicles. The data may be provided as an input to one or more Advanced Driver Assistance Systems (ADAS) and/or navigation devices.

Data indicative of the determined deviation, e.g. the location thereof, and optionally indicative of any additional information relating to the deviation, may be transmitted e.g. by a server. The server may then be the server that carried out the determination. The information may be transmitted to one or more, and preferably a plurality of vehicles. The data may be transmitted to navigation device(s), which may be PNDs and/or integrated navigation devices, and/or to ADAS of the vehicles.

The data may be used in various manners, whether or not it is provided to a vehicle, or as an input to an ADAS or navigation device. For example, data could also be used by a route planning apparatus, e.g. implemented via a web based interface. Any of the steps described below may be implemented using a vehicle based navigation device, e.g. PND or integrated device, ADAS or, where navigation functionality is not required, any suitable, e.g. web based, route planning application unless the context demands otherwise.

In some embodiments, the data may be used, e.g. by a navigation device or ADAS, to cause information indicative of the deviation in the stretch to be displayed to a driver, to enhance an electronic map with information indicative of the deviation, or to provide a warning or alert indicative of the deviation. This may be issued via a navigation device, ADAS or could be in the form of an email alert or similar, relating to a route planned via a route planning application.

In some embodiments in which the method comprises using the data to enhance an electronic map, the map is enhanced with information relating to the deviation. The map may be enhanced with any of the types of information indicative of the determined deviation discussed e.g. one or more of a geographic location of the deviation, spatial extent and/or geographic location of the deviation, or an expected speed of travel along the deviated stretch. Enhancement of a map may be carried out by a navigation device or even ADAS, or may be carried out by a server, to enhance a web based electronic map forming part of a route planning system. Thus the map may be a map displayed by a navigation device, ADAS or display associated with any route planning device.

In some embodiments, the data is used to provide a lane level view of a path along the navigable stretch.

In some preferred embodiments, the data indicative of the determined deviation is provided as an input to a function or functions of an ADAS. The function may be an autonomous steering function.

In some embodiments an ADAS or navigation device may use the data take steps to reduce driver workload during travel along the deviated stretch. This may be by the device or ADAS reducing the mental capacity that it demands e.g. for route guidance or other functions, freeing up capacity for the more demanding navigation along the deviated portion of the stretch, disabling certain non essential functionality e.g. the ability to make calls etc. Alternatively or additionally, the method may comprise an ADAS or navigation device providing guidance to a driver to assist in navigation along the deviated portion of the stretch.

The data may be used in the generation of a route. This may be carried out by a navigation device, route planning apparatus, whether associated with a vehicle or not, or an ADAS system. For example, the information may be used to generate a route, or new route, avoiding the deviated portion. While the present invention is particularly useful in the context of providing information regarding an event which may affect travel in a navigation context, e.g. during navigation along a given route, the invention is also applicable to route planning systems, which may not include navigation functionality. For example these may be systems which are used by a user to plan a route at home before setting out, etc. Such systems may be implemented via a laptop, desktop or other computing device, or a mobile phone, etc. In some embodiments the data is used in the generation of a route via a web based route planning system. Data indicative of the deviation may or may not be output to a user, e.g. driver. For example, the data may be used as an input to an ADAS system which may then use the information, e.g. in route planning (which may be an initial route calculation or a recalculation), without necessarily outputting the information to a user. In embodiments in which the data indicative of a deviation is provided to a user, e.g. driver of the vehicle, this may be done directly or indirectly. For example, the data may be used to enhance an electronic map being displayed to a user with the information. The data may be used to provide a lane level view of a path through the deviated region. In other arrangements, rather than being output via a navigation device or ADAS, the data may be output to a user via a route planning application that is not associated with a vehicle e.g. a web based application.

Deviations in a navigable stretch may often have an effect upon traffic flow along the navigable stretch. Knowledge of deviations is therefore useful in providing accurate traffic information. In preferred embodiments, therefore, the method comprises using the deviation data to provide traffic information. The traffic information may be a traffic message, such as a TMC or other message. The method may therefore comprise generating a traffic message using the determined deviation information. In these preferred embodiments, the generated traffic message may be used alone, or with other sources of information by a traffic information service. The message may be provided directly to end users, e.g. users of navigation devices, or may be provided to a third party traffic information provider. In these embodiments, the present invention provides an additional source of traffic data which can be sold to other parties. In preferred embodiments, the traffic information e.g. message is generated by a server, e.g. a traffic server. The method may further comprise the server transmitting the traffic alert. The alert may be transmitted to a plurality of navigation devices, which may be PNDs and/or integrated navigation devices, and/or to a plurality of ADAS.

In other embodiments, rather than generating a traffic message indicative of the determined deviation, the method may comprise using the determined deviation to refine or validate a traffic message indicative of an event affecting traffic flow along the navigable stretch. For example, an existing message may indicate the presence of roadworks on the navigable stretch, but may not indicate a deviation in the stretch that is a result of the roadworks. In embodiments of the invention, a message, which may be received from a third party provider, may be enhanced with information indicative of the determined deviation, and any additional information relating thereto.

In embodiments in which the determined deviation is used to provide traffic information, e.g. a traffic message, the method preferably comprises determining an expected speed of travel along the deviated portion of the stretch, and including data indicative of the expected speed in the traffic information or message. This may enable more accurate estimated times of arrival and route durations for routes including the deviated portion to be calculated. An expected speed of travel may be determined using the positional data.

Any of the methods in accordance with the present invention may be implemented at least partially using software, e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which when used to operate a system or apparatus comprising data processing means causes in conjunction with said data processing means said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention. Regardless of its implementation, a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide navigation functionality. It follows therefore that in the context of the present application, a navigation device is intended to include (without limitation) any type of navigation device, irrespective of whether that device is embodied as a PND, a navigation device built into a vehicle, or indeed a computing resource (such as a desktop or portable personal computer (PC), mobile telephone or portable digital assistant (PDA)) executing navigation software. In addition, the present invention is applicable to devices with the ability to obtain position data for the device, but which may not provide navigation or route planning functionality. For example, such a device could be located in a vehicle, and arranged to provide navigation assistance via an instrument panel of the vehicle, obtaining position data from the vehicle or a position determining e.g. GPS system of the device itself.

Figure 1:
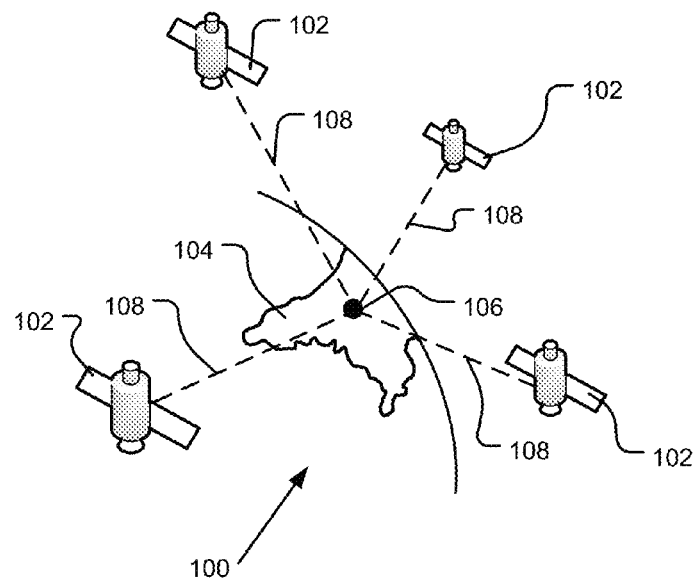
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
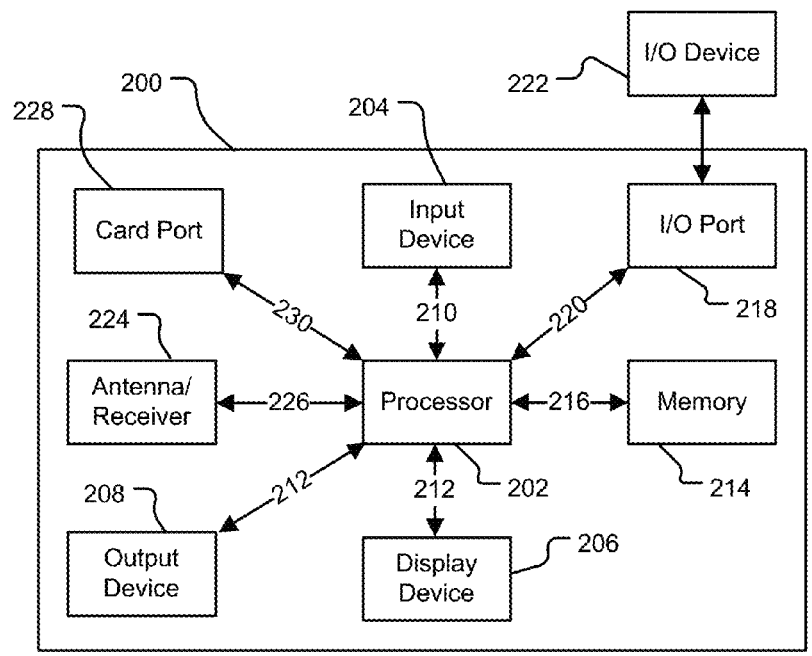
FIG. 2 is a schematic illustration of electronic components arranged to provide a navigation device.

FIG. 2 is an illustrative representation of electronic components of a navigation device 200 usable according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
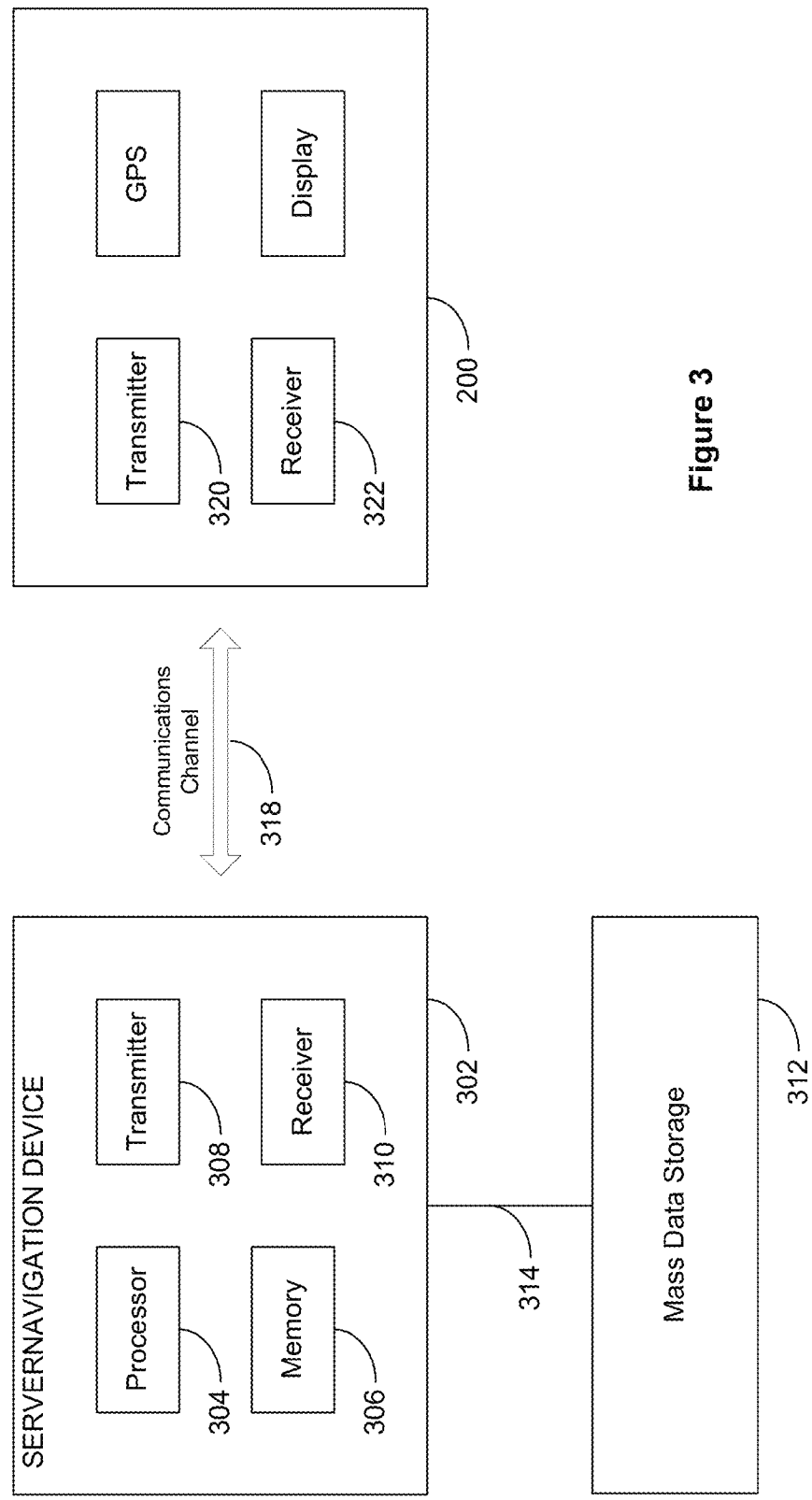
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GPRS, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4:
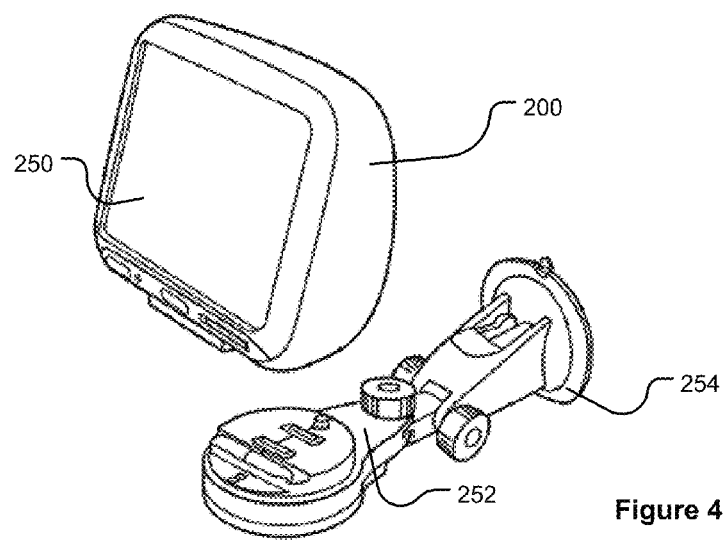
FIG. 4 is an illustrative perspective view of a navigation device.

FIG. 4 is a perspective view of a navigation device 200. As shown in FIG. 4, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4, the navigation device 200 can be docked or otherwise connected to an arm 292 of the docking station by snap connecting the navigation device 292 to the arm 292 for example. The navigation device 200 may then be rotatable on the arm 292. To release the connection between the navigation device 200 and the docking station, a button on the navigation device 200 may be pressed, for example. Other equally suitable arrangements for coupling and decoupling the navigation device to a docking station are well known to persons of ordinary skill in the art.

FIGS. 1 to 4 are provided by way of background, illustrating certain features of navigation apparatus which may be used to implement methods of the present invention.

Some preferred embodiments of the invention will now be described by reference to FIGS. 5 to 8. The methods of the present invention identify lateral deviations in course which occur along a stretch of road. Typically the deviation in course may be due to the presence of roadworks. For example, where roadworks are present along a road stretch, vehicles may be forced to use the opposite driving carriageway, or the hard shoulder along a portion of the stretch. Lateral deviations of this type are often associated with reduced traffic flow rates. It is therefore useful to know the position and extent of any such deviation, and ideally, its impact on expected travel times/speeds through the affected stretch. Such information is currently not easily obtainable, and is typically not included in traffic reports. The present invention provides a simple and reliable way to obtain such information using readily available vehicle "probe", i.e. positional data, without requiring additional infrastructure.

Figure 5:
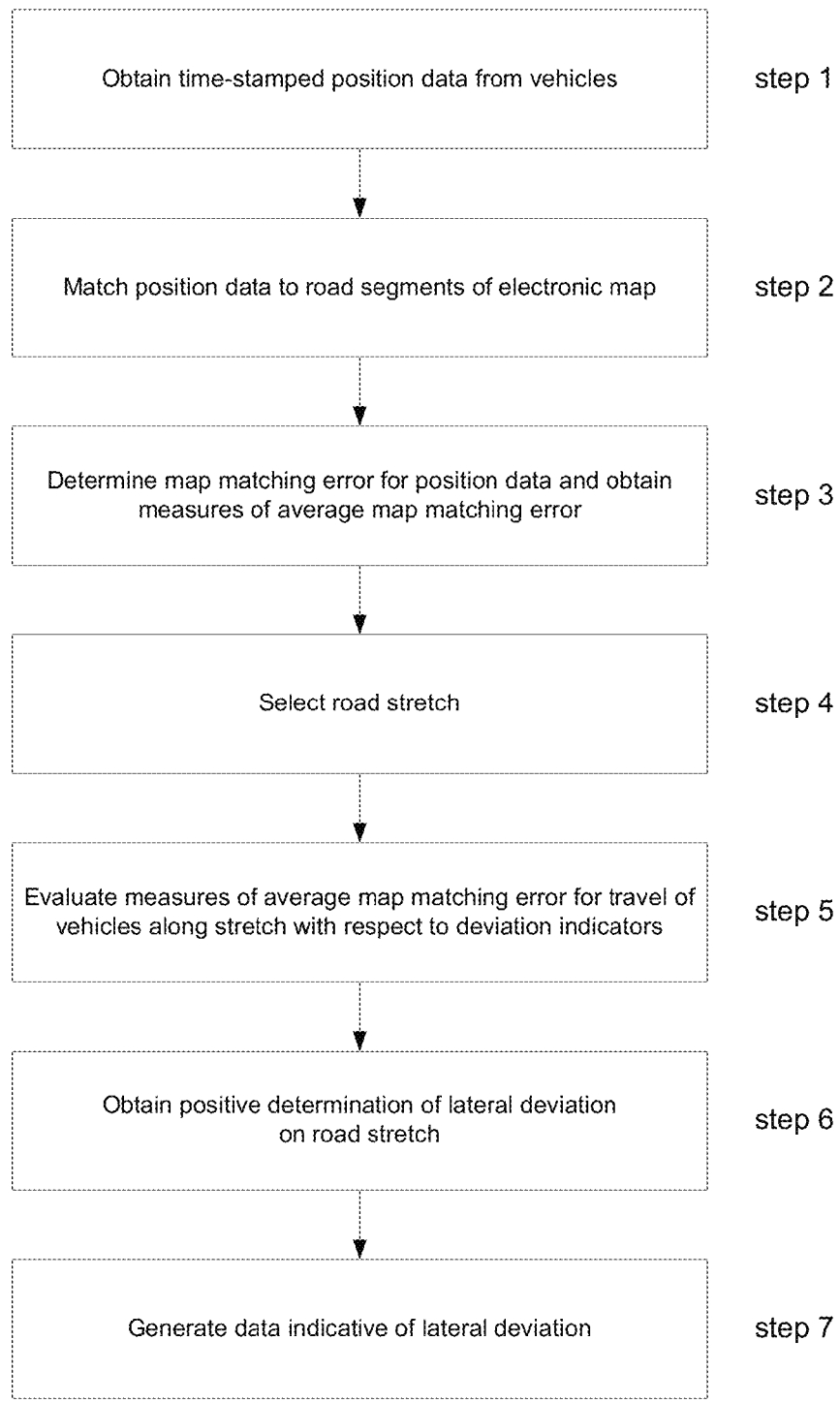
FIG. 5 illustrates certain steps of a method in accordance with one embodiment of the present invention.

Referring to FIG. 5, the steps involved in one embodiment of a method in accordance with the invention will be described. It will be appreciated that modifications may be made to the method, and the order of the steps may be changed.

In step 1, probe data is obtained from devices having positioning capability, e.g. PNDs travelling in a given geographic region. The devices are associated with vehicles, such that the position of the devices corresponds to that of the vehicles. The data is "live" in that it relates to travel in the preceding 15 minutes or less. Of course, in other arrangements older, i.e. historic, data may be used. However, the use of "live" data is advantageous as it may provide the ability to detect road deviations effectively in "real-time", and may be used e.g. in providing up to data traffic information.

The probe data is time stamped position data representing the movement of the devices, i.e. vehicles, along roads of a road network in the geographic region with respect to time, and is in the form of a plurality of probe traces representing the movement of each device over time. The data may be in the form of live GPS fixes from the vehicles. The data is received at a traffic server, and the steps described in FIG. 5 are carried out at the traffic server.

In step 2, this raw probe data is matched to an electronic map of the geographic region. The electronic map represents the road network using a plurality of road segments connecting nodes as known in the art. In this map matching process, each individual item of time stamped position data, i.e. each GPS fix obtained from a vehicle in the region, must be correlated to a position along a road segment of the road network represented by the electronic map. This may be achieved using any suitable map matching algorithm or algorithms known in the art. Each item of position data will be associated with a map matching error, indicative of the lateral offset of the position according to the data and the position to which it is taken to correspond on a road segment. The map matching error is determined by reference to a centerline of the road segment. A given item of position data will be mapped to a longitudinal position along the centerline of the road segment. The centerline of a road segment is a logical construct known in the art, and defines a position of the road segment. A road segment of an electronic map may be thought of as a series of geo-points connected by the centerline, which extends along the length of the segment. The centerline does not normally take into account the width of the roadway represented by the segment. A road segment may be single directional, e.g. a highway, or may be bi-directional. In a bi-directional map segment, the centerline may be the same for both directions of travel. Of course, provided that the map matching error is expressed by reference to a suitable reference line along the road segment, the centerline need not be defined in this manner. For example, in a high resolution system, it might be necessary to include more than one "centerline" per road segment, e.g. one per lane or per direction of travel, to provide higher resolution map matching to a position along the segment. However, currently, a single centerline per road segment, whether single or bi-directional, is typically used in mapping systems, as GPS signals have an error of around 10 m in any case.

The map matching process may take into account the paths followed by devices, i.e. the position of the device before and after the position data being matched, and may simultaneously take into account multiple road segments ahead and back of the segment being considered. This would be appropriate for example when matching to a road segment that defines a highway slip road i.e. entry or exit road.

Map matching errors arise for various reasons. Positioning, e.g. GPS, signals tend to fluctuate, such that they exhibit "noise". Furthermore there is an inevitable limit to the resolution of GPS signals, currently of around 10 m. Other errors arise where the position of a road segment according to an electronic map does not precisely correspond to the position of the segment in reality, e.g. such that the centerline of the road segment is not correctly geo-referenced in the map. The present invention includes certain steps which enable a deviation in course along a road segment to be detected using the map matching error, in a manner which can distinguish the deviation from regions where there may be map matching error attributable to other causes such as the inherent fluctuation in GPS signal or geo-referencing errors.

In step 3 the map matching errors obtained using the position data from different vehicles traversing a given road segment are averaged to provide two different types of average map matching error for each of a plurality of positions along the road segment in a given driving direction. This may be done for positions at any suitable interval along the road segment. Each item of position data from the probe data will be associated with a map matching error. The map matching error may be positive or negative depending upon the direction of lateral offset from the road segment centerline.

The first is an average map-matching error which is defined as an arithmetic mean of the map-matching errors of the probe traces. The second is an average absolute map-matching error, which is defined as the arithmetic mean of the absolute values of the map matching errors. The average absolute map matching error measures the magnitude of the map matching error associated with the probe data, and is indifferent as to the direction of the error, i.e. whether left or right relative to the centerline of a segment. In contrast, the average map matching error may be positive or negative, and may therefore reflect the direction of a systemic shift in the distribution relative to the centerline of the road segment, e.g. to the left, to the right, or zero in the case of no systemic shift.

Accordingly, in the map matching process for a road element, for each probe vehicle measurement i, a map matching error $\Delta x_i$, typically given in meters, is obtained. When collecting several measurements i=1, 2, ... n, the following standard mean measures can be determined:

the average map matching error is the arithmetic mean of the map matching error measurements, and is described by the following equation:

$$\langle \Delta x \rangle = \frac{1}{n} \sum_{i=1}^{n} \Delta x_i \qquad \text{Eqn. 1}$$

the average absolute map matching error is the arithmetic mean of the absolute values of the map matching errors:

$$\langle |\Delta x| \rangle = \frac{1}{n} \sum_{i=1}^{n} |\Delta x_i| \qquad \text{Eqn. 2}$$

By way of illustration, taking a perfectly located road element, i.e. with no mapping error, and with infinite lateral extension and no systematic drifts in the measured GPS signals, the average map matching error according to Eqn. 1 would be zero, with positive and negative values cancelling out, while the average absolute map matching error would be equivalent to the order of the average GPS signal noise.

In step 4, a road stretch to be tested for a deviation in course is selected. The road stretch for consideration may be selected by reference to traffic information. For example, a traffic message may be received, e.g. a TMC message, indicating heavy traffic along the stretch or a portion thereof. The method of the present invention may then be implemented to determine whether or not this is attributable to a deviation in road course, and if so, to obtain details of the deviation. In other arrangements, the road stretch may be selected as part of a process of attempting to detect deviations in road course in a road network, where a deviation is not necessarily initially suspected.

The selected road stretch has a length corresponding to two or more consecutive road segments of a digital map. This may facilitate reliably identifying a deviation in course.

In step 5, the average map matching error measures, i.e. the average map matching error and average absolute map matching error, for each segment making up the selected road stretch are evaluated using the following method. The method may be implemented using any suitable algorithm.

Both map matching error measures, i.e. the average map matching error and the average absolute map matching error, with respect to distance along the selected stretch are considered for each direction of travel. A potential, i.e. candidate, deviation in course may be detected from this data as described in more detail by reference to FIGS. 7A and 7B below. In general, a region along the stretch where the average map matching error in addition to the average absolute map matching error is relatively high in magnitude compared to regions on one or both sides thereof may be considered indicative of a potential deviation in course for further verification. Map matching errors which are not indicative of a deviation in course, e.g. being attributable to inherent errors in positioning data signals or mapping errors will tend to result in errors occurring in opposite directions such that the average map matching error, will tend to be low. In contrast, a deviation in course will result in a systemic shift in the map matching error. Thus a correlation of the average map matching error and the average absolute map matching error may be used to indicate a systemic lateral offset indicative of a potential deviation.

Various additional indicators of deviation in course may be detected from the map matching error measures to provide verification or otherwise of a detected potential deviation in course. A determination of a deviation in course may be made when one or more of the additional indicators of deviation described below are additionally present on the basis of probe data relating to a given direction of travel. In other arrangements, a determination of a deviation in course may be made without reference to any of the additional deviation indicators, simply accepting a potential deviation identified on the basis of the map matching error measures as being a deviation in course. A suitable algorithm may be used to implement tests for any or all of these indicators to provide a determination of a deviation in course to a required level of reliability for a given context. It will be appreciated that any of the steps of the method carried out to determine the deviation in course may be carried out in any order, and it is not necessary that all steps described are performed.

Suitable indicators of deviation in course which may be detected using the average map matching error and average absolute map matching error for a given direction of travel are:

the magnitude of the average map matching error for a detected potential deviation in course is above a given threshold; the threshold may be greater than or equal to 10 m, being the typical order of GPS precision;

the magnitude of the average absolute map matching error for a detected potential deviation in course is above a given threshold; the threshold may be greater than or equal to 10 m, being the typical order of GPS precision;

the sign of the average map matching error in the region of the detected potential deviation indicates that a direction of the potential deviation is in a direction toward the opposite driving direction; when roadworks are present, the most likely direction of deviation in course for a given direction of travel would be toward the carriageway for the opposite direction of travel;

a detected potential deviation in a first direction, e.g. to the left, is followed by a deviation in the opposite direction, i.e. toward the original path, within a distance that might reasonably be expected in a deviation of course;

a spatial extension of a detected potential deviation meets certain criteria, e.g. a minimum length; a deviation in course will typically have a minimum length in order to accommodate lateral vehicle dynamics or steering processes; and a potential deviation is present in the opposite direction of travel along a corresponding portion of the road stretch to the detected potential deviation along a first direction of travel; where a deviation in one driving direction is present, this often necessitates a deviation in the opposite direction of travel to accommodate the deviation.

In addition, determination of a deviation in course may involve consideration of the complexity of the road network in the region containing the selected road stretch. In regions of high complexity, e.g. a clover-leaf junction, map matching errors may be systematically increased such that a region of higher map matching error may not be indicative of a deviation in course.

Figure 6:
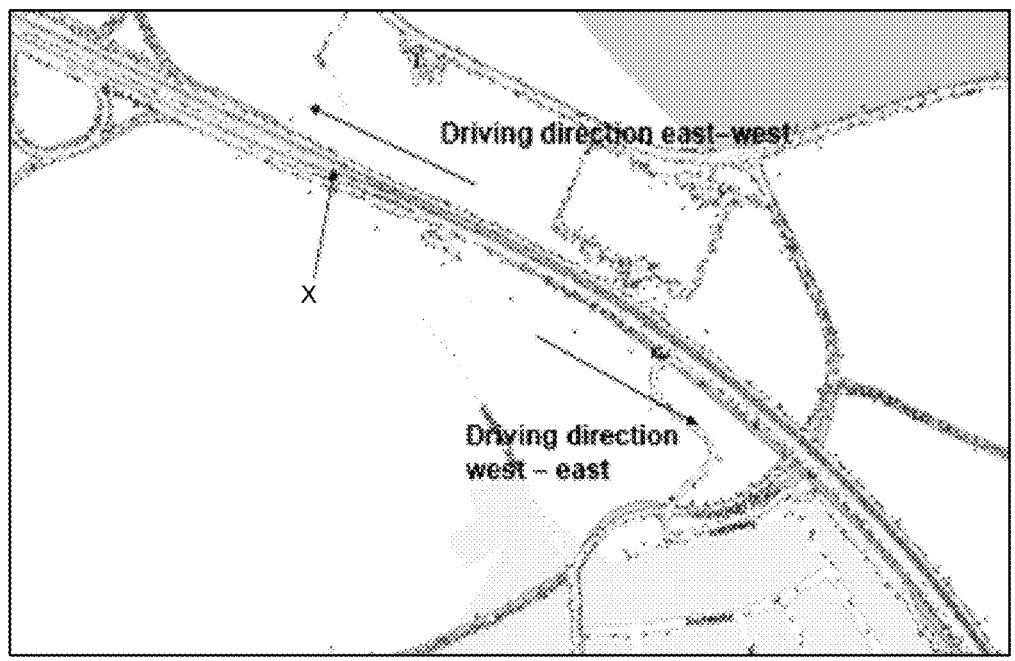
FIG. 6 illustrates a road stretch.
Figure 7A:
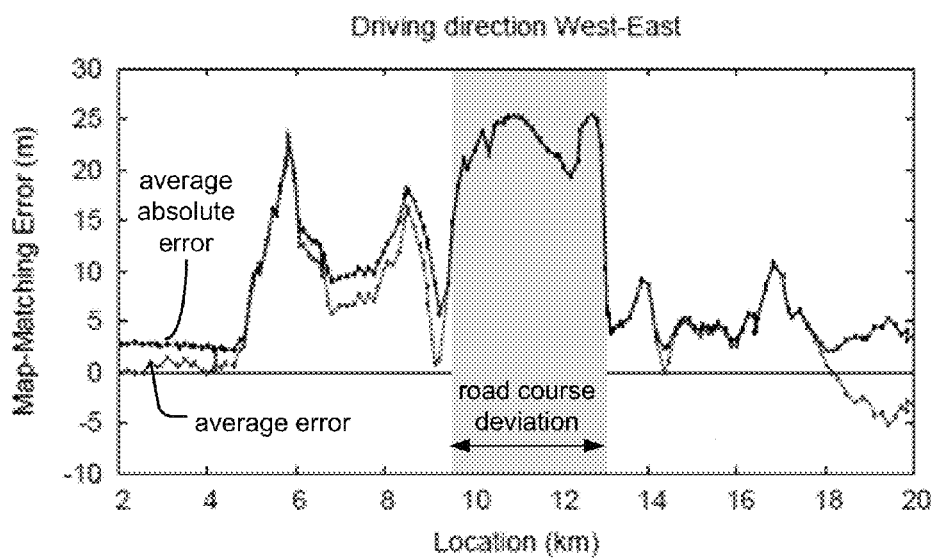
FIG. 7A illustrates average map matching error measures against distance for the west-east (W-E) direction travel along the road stretch.
Figure 7B:
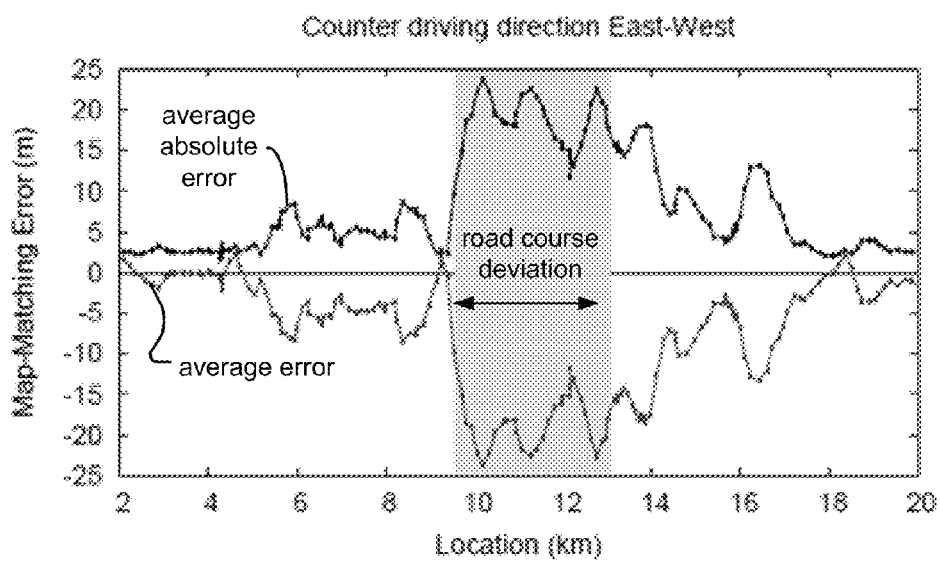
FIG. 7B illustrates average map matching error measures against distance for the east-west (E-W) direction travel along the road stretch.

Referring to FIGS. 6, 7A and 7B, an example of a determination of a deviation in course of a road stretch based on the map matching error measures described above, and using some of the above indicators of deviation will be described.

FIG. 6 illustrates a stretch of road in a right hand drive region. The road stretch is made up of two or more road segments, and is bi directional, including an east-west (E-W) and a west-east (W-E) driving direction. Superimposed over the underlying map data are a plurality of dots; each dot representing a recorded position of a vehicle travelling along the stretch of road. Darker areas are indicative of a greater concentration of recorded positions, and are thus representative of the most commonly travelled route along the stretch of road. A deviation in the course of the W-E driving direction can clearly be seen in the figure, with the beginning of the deviation being marked with an X for the sake of clarity.

FIG. 7A illustrates the average map matching error and the average absolute map matching error against distance along the road stretch for the W-E driving direction. FIG. 7B illustrates the corresponding average map matching error and the average absolute map matching error against distance along the road stretch for the opposite E-W driving direction. In FIGS. 7A and 7B, a positive map matching error indicates a lateral offset in the left hand direction, while a negative map matching error indicates a lateral offset in the right hand direction from an expected course i.e. the segment centerline.

Looking at FIGS. 7A and 7B, the portion of the road stretch having the deviation in course is shaded in grey, and is located between the 9.5 km and 13 km points along the road stretch due to roadworks. The map matching error measures indicates this deviation in the following manners. In this region, both the average map matching error and the average absolute map matching error are high in magnitude. Thus the correlation of these measures and their relative magnitude are indicative of a potential deviation in course. The following additional indicators of deviation are present confirming the deviation in course. The magnitude of both the average map matching error and average absolute map matching error exceeds a given threshold which might be attributable to other factors, e.g. inherent inaccuracies in data or mapping, etc. The order of magnitude of the lateral offset indicated by the map matching errors in this region is around 23 m, significantly above the typical GPS error of 10 m. The spatial extent of the region having the potential deviation in course is also of a level consistent with a deviation in course, being around 3.5 km.

In the driving direction W-E, the deviation is to the left. This is toward the roadway in the opposite direction, which is most common where a deviation in course is present, providing an indication that the detected potential deviation is indeed a deviation in course.

The map matching error measures for the opposite driving direction E-W are also indicative of a potential deviation in course at a corresponding position along the stretch, indicating that a deviation was needed to make way for traffic following a deviation in course on the opposite W-E driving direction. This provides further confirmation of a deviation in course in the W-E direction. The average map matching error in this portion of the road stretch in the E-W direction has an opposite sign to the average absolute error for the corresponding region, but the same absolute values.

There is also a significant map matching error present between the 5 km and 9 km points along the road stretch in the W-E direction. However, by reference to the map for the region shown in FIG. 7, it can be seen that this region corresponds to that of the complex junction, and therefore is not taken as being indicative of a deviation in course. Furthermore, there is no corresponding deviation in the opposite E-W driving direction at this point.

Returning now to FIG. 5, in step 6, a positive determination of a deviation in course is made. Data indicative of the determined deviation in course, for example its location, start point, end point, direction (e.g. to left or to right), spatial extent along the road stretch, and magnitude, is generated, and may be stored. Furthermore, by reference to the probe traces for travel through this portion of the road stretch, an average expected speed of travel through the region is determined. This is made possible through the use of the live positional data, and provides an additional useful piece of information about the severity of any impact on traffic flow caused by the deviation for use e.g. in determining travel times for used in route determination in the region.

In step 7, a traffic message containing the generated data is generated and transmitted to vehicles.

Some uses of the deviation in course data will now be described.

A particularly important application of the methods of the present invention is in determining lateral deviation data which may be used in traffic systems. As illustrated by reference to FIG. 5, the steps of the present invention may be implemented by a traffic server, and the resulting deviation data transmitted to vehicles, e.g. to PNDs of a navigation system. Of course, the data may alternatively or additionally be provided to integrated navigation devices of vehicles and/or ADAS systems of vehicles. In other arrangements, the data my be made accessible to route planning applications, not necessarily implemented via navigation devices, e.g. instead being implemented by a web based system. The information may be used to create a traffic message, which may be output via a TMC system, or the data, or a traffic message containing the data, could be provided to a third party to enhance their traffic data service. The present invention may provide a way of verifying and/or enhancing the traffic data contained in a traffic message, e.g. received from a third party, by considering an identified road stretch or a stretch containing an identified road stretch, and determining whether any lateral deviation is present. The data may be used to generate an information feed, which may be live.

Data received by navigation devices or an ADAS may be used in various manners. The information may be used in route planning, determining estimated times of arrival/route durations, to enhance a digital map display, to provide a visual guidance of a driver through the affected region.

As well as being useful in traffic applications, the data obtained in accordance with the invention finds numerous other uses. The data may be used as an input to an ADAS. Knowledge of any lateral deviation in road course may be used by the ADAS in a lane guidance, lane departure warning system, or an automated steering system.

An ADAS or navigation system may also use the information in order to adjust a mental workload of the driver appropriately. Travel through the deviation may be assumed to necessitate greater mental effort than travel through an undeviated region, and the system may make adjustments to try to reduce demands made on the drivers mental capacity during travel through the region, or to try to reduce the mental workload required to traverse the region.

Figure 8:
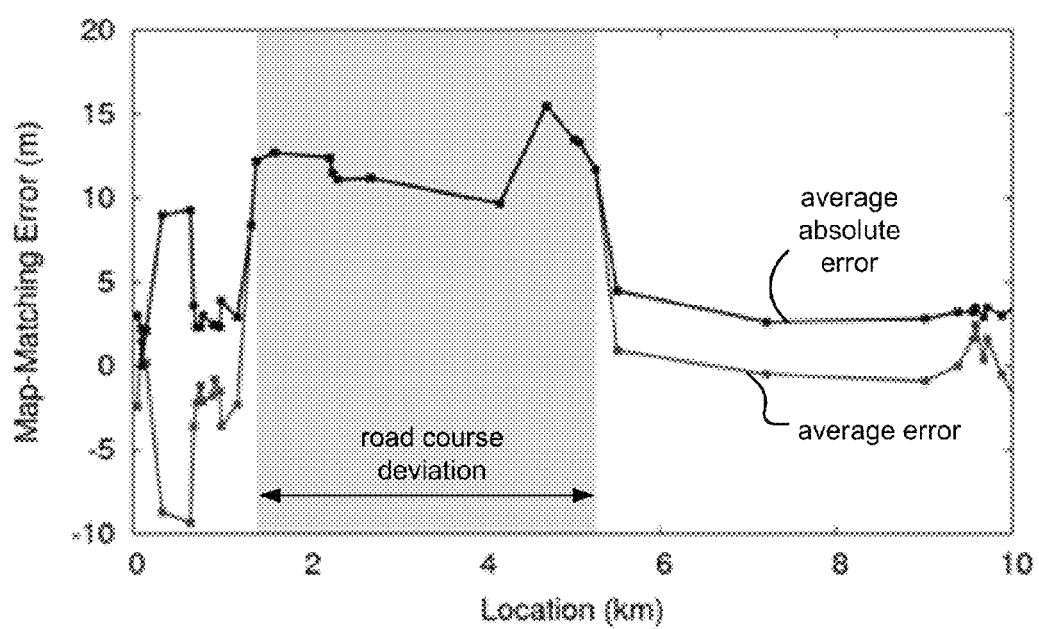
FIG. 8 illustrates another example of the average map matching error measures against distance along a road stretch.

FIG. 8 illustrates a further example of the way in which the average map matching error and average absolute map matching error for a given road stretch for a given direction of travel may be used to identify a potential deviation in course along the stretch. Here a road deviation is present in the shaded are between around 1.5 km and just over 5 km along the stretch. This is indicated by a region in which both error measures, i.e. the average map matching error and average absolute map matching error are relatively high in magnitude. Here, the indicated deviation corresponds to a positive average map matching error, being a deviation to the left.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of determining a deviation in the course of a navigable stretch of a network of navigable segments in an area represented by an electronic map, the electronic map comprising a plurality of segments representing the navigable segments in the area covered by the electronic map, wherein the navigable stretch is represented by at least a portion of one or more segments of the electronic map, the method comprising:

obtaining, by at least one processor, positional data relating to the movement of a plurality of devices along the navigable stretch, said positional data comprising a plurality of positions;

determining, by the at least one processor, a map matching error for a plurality of positions of the positional data, the map matching error being indicative of a difference between the position of the positional data and a position on a segment of the electronic map to which the position is matched;

using, by the at least one processor, data indicative of the determined map matching error for the plurality of positions along the navigable stretch to determine a deviation indicative of a lateral offset in the course of at least a portion of the navigable stretch as indicated by a longitudinal reference line associated with the respective one or more segments of the electronic map; and generating, by the at least one processor, data indicative of the determined deviation.

2. The method of claim 1, wherein the obtained positional data is live positional data relating to the movement of a plurality of device along the navigable stretch in a relatively current time period, and the determined deviation in course is a temporary deviation.

3. The method of preceding claim 1, further comprising using two or more measures indicative of the map matching error of the positional data relating to the movement of the plurality of devices with respect to distance along the navigable stretch to detect a potential deviation in course of at least a portion of the navigable stretch.

4. The method of claim 1, comprising detecting a potential deviation in course by reference to a magnitude of at least one of an average map matching error and an average absolute map matching error of the positional data for the plurality of devices.

5. The method of claim 4, comprising detecting the presence of a potential deviation in course when at least one of: the magnitude of the average map matching error is greater than or equal to the magnitude of the average absolute map matching error; and when a magnitude of both the average map matching error and the average absolute map matching error exceed a given threshold or thresholds.

6. The method of claim 1, comprising detecting a potential deviation in course of at least a portion of the navigable stretch using the data indicative of the map matching error of the positional data, and making a determination of the presence of a deviation in course when one or more deviation in course indicators are found to be present using the data indicative of a map matching error of the positional data, the one or more deviation in course indicators being based on one or more of a spatial extent, direction or magnitude of the detected potential deviation in course.

7. The method of claim 6, comprising determining the presence of a deviation in course indicator when a detected potential deviation includes a deviation in a first direction away from an expected course followed by a deviation in an opposite second direction back toward the expected course along the navigable stretch.

8. The method of claim 6, comprising determining the presence of a deviation in course indicator when a detected potential deviation has a spatial extent exceeding a given threshold.

9. The method of claim 6, wherein the detected potential deviation is in respect of a first direction of travel, and wherein the method comprises determining the presence of a deviation in course indicator when a potential deviation in course is additionally detected for the opposite driving direction using the data indicative of a map matching error of the positional data.

10. The method of claim 1, comprising generating data indicative of one or more of a location of the determined deviation, a spatial extent of the deviation, a direction of the deviation, and an expected speed of travel along the deviated portion of the stretch.

11. The method of claim 1, further comprising transmitting data indicative of the determined deviation to one or more vehicles.

12. The method of claim 11, comprising using the data indicative of the deviation to perform one or more of the following steps:
- to provide traffic information;
- to guide a driver along the deviated portion of the stretch;
- to generate a lane level view of the stretch in the region of the deviation;
- to enhance an electronic map;
- to provide a warning or alert regarding the deviation to a driver;
- to display the deviated portion of the stretch to a driver;
- to assist the driver in navigating along the deviated stretch; and
- to determine an expected time of arrival for a route incorporating the deviated portion.

13. The method of claim 1, further comprising storing the generated data in a database.

14. A non-transitory computer readable medium comprising computer readable instructions, which, when executed on a computing device comprising at least one processor, cause the computing device to perform a method according to claim 1.

15. A computing device for determining a deviation in the course of a navigable stretch of a network of navigable segments in an area represented by an electronic map, the electronic map comprising a plurality of segments in the area covered by the electronic map, wherein the navigable stretch is represented by at least a portion of one or more segments of the electronic map, the computing device comprising at least one processor and a memory containing instructions that, when executed by the at least one processor, cause the computing device to:
- obtain positional data relating to the movement of a plurality of devices along the navigable stretch, said positional data comprising a plurality of positions;
- determine a map matching error for a plurality of positions of the positional data, the map matching error being indicative of a difference between the position of the positional data and a position on a segment of the electronic map to which the position is matched;
- use data indicative of the determined map matching error for the plurality of positions along the navigable stretch to determine a deviation indicative of a lateral offset in the course of the navigable stretch as indicated by a longitudinal reference line associated with the respective one or more segments of the electronic map; and
- generate data indicative of the determined deviation.

* * * * *